(12) United States Patent
Harper

(10) Patent No.: US 8,299,961 B2
(45) Date of Patent: Oct. 30, 2012

(54) METHOD AND SYSTEM FOR SELECTING OPTIMAL SATELLITES IN VIEW

(75) Inventor: Neil Harper, Mangerton (AU)

(73) Assignee: Andrew LLC, Hickory, NC (US)

( * ) Notice: Subject to any disclaimer, the term of this patent is extended or adjusted under 35 U.S.C. 154(b) by 0 days.

(21) Appl. No.: 13/190,048

(22) Filed: Jul. 25, 2011

(65) Prior Publication Data

US 2012/0007774 A1 Jan. 12, 2012

Related U.S. Application Data

(63) Continuation of application No. 12/403,454, filed on Mar. 13, 2009, now Pat. No. 7,986,266.

(51) Int. Cl.
*G01S 19/28* (2010.01)

(52) U.S. Cl. .................................. 342/357.67

(58) Field of Classification Search .............. 342/357.67
See application file for complete search history.

(56) References Cited

U.S. PATENT DOCUMENTS

| 8,032,151 B2 * | 10/2011 | Paulson et al. ............. 455/456.1 |
| 2006/0114150 A1 * | 6/2006 | van Diggelen et al. .. 342/357.02 |
| 2008/0262728 A1 * | 10/2008 | Lokshin et al. ................ 701/216 |
| 2009/0061898 A1 * | 3/2009 | Johnson et al. ............. 455/456.2 |
| 2009/0253437 A1 * | 10/2009 | Uusitalo et al. ............. 455/456.1 |

* cited by examiner

*Primary Examiner* — Harry Liu
(74) *Attorney, Agent, or Firm* — Duane Morris LLP

(57) ABSTRACT

A system and method for determining one or more satellites in view of a wireless device. A request for satellite assistance data may be received from a requesting entity and a reference location determined as a function of the request. A set of satellites may be determined as a function of the reference location. Subsequent cached information may be determined for each satellite in the set of satellites if cached information already existing for each satellite in the set of satellites has been cached for greater than a predetermined time period. This subsequent cached information may then replace the previously existing cached information for the reference location. One or more satellites in view of the wireless device may then be determined as a function of either the subsequent cached information or previously existing cached information, and assistance data may be provided to the requesting entity to determine an estimated location of the wireless device.

29 Claims, 6 Drawing Sheets

METHOD AND SYSTEM FOR SELECTING OPTIMAL SATELLITES IN VIEW

RELATED APPLICATIONS

The present application claims the priority benefit of copending U.S. application Ser. No. 12/403,454 filed 13 Mar. 2009 entitled "Method and System for Selecting Optimal Satellites in View", the entirety of which is hereby incorporated herein by reference.

BACKGROUND

Radio communication systems generally provide two-way voice and data communication between remote locations. Examples of such systems are cellular and personal communication system ("PCS") radio systems, trunked radio systems, dispatch radio networks, and global mobile personal communication systems ("GMPCS") such as satellite-based systems. Communication in these systems is conducted according to a pre-defined standard. Mobile devices or stations, also known as handsets, portables or radiotelephones, conform to the system standard to communicate with one or more fixed base stations. It is important to determine the location of such a device capable of radio communication especially in an emergency situation. In addition, in 2001 the United States Federal Communications Commission ("FCC") required that cellular handsets must be geographically locatable. This capability is desirable for emergency systems such as Enhanced 911 ("E-911"). The FCC requires stringent accuracy and availability performance objectives and demands that cellular handsets be locatable within 100 meters 67% of the time for network based solutions and within 50 meters 67% of the time for handset based solutions.

Current generations of radio communication generally possess limited mobile device location determination capability. In one technique, the position of the mobile device is determined by monitoring mobile device transmissions at several base stations. From time of arrival or comparable measurements, the mobile device's position may be calculated. However, the precision of this technique may be limited and, at times, may be insufficient to meet FCC requirements. In another technique, a mobile device may be equipped with a receiver suitable for use with a Global Navigation Satellite System ("GNSS") such as the Global Positioning System ("GPS"). GPS is a radio positioning system providing subscribers with highly accurate position, velocity, and time ("PVT") information.

FIG. 1 is a schematic representation of a constellation 100 of GPS satellites 101. With reference to FIG. 1, GPS may include a constellation of GPS satellites 101 in non-geosynchronous orbits around the earth. The GPS satellites 101 travel in six orbital planes 102 with four of the GPS satellites 101 in each plane. Of course, a multitude of on-orbit spare satellites may also exist. Each orbital plane has an inclination of 55 degrees relative to the equator. In addition, each orbital plane has an altitude of approximately 20,200 km (10,900 miles). The time required to travel the entire orbit is just under 12 hours. Thus, at any given location on the surface of the earth with clear view of the sky, at least five GPS satellites are generally visible at any given time.

With GPS, signals from the satellites arrive at a GPS receiver and are conventionally utilized to determine the position of the receiver. GPS position determination is made based on the time of arrival ("TOA") of various satellite signals. Each of the orbiting GPS satellites 101 broadcasts spread spectrum microwave signals encoded with satellite ephemeris information and other information that allows a position to be calculated by the receiver. Presently, two types of GPS measurements corresponding to each correlator channel with a locked GPS satellite signal are available for GPS receivers. The two carrier signals, L1 and L2, possess frequencies of 1.5754 GHz and 1.2276 GHz, or wavelengths of 0.1903 m and 0.2442 m, respectively. The L1 frequency carries the navigation data as well as the standard positioning code, while the L2 frequency carries the P code and is used for precision positioning code for military applications. The signals are modulated using bi-phase shift keying techniques. The signals are broadcast at precisely known times and at precisely known intervals and each signal is encoded with its precise transmission time. There is also an L2C signal being transmitted by several satellites. The L2C signal is a second civilian frequency transmitted by GPS satellites. L1 transmits the Coarse Acquisition ("C/A") code. L2C transmits L2CM (civil-moderate) and L2CL (civil long) codes. These codes allow a device to differentiate between satellites that are all transmitting on the same frequency. The C/A code is 1 milliseconds long, the L2CM is 20 milliseconds long and the L2CL is 1.5 seconds long. The L2C codes provide a more robust cross-correlation performance so that reception of weak GPS signals is less affected by simultaneously received strong GPS signals. The civil navigation message ("CNAV") is the broadcast model that can be transmitted on the L2C and provides a more accurate and frequent message than the legacy navigation message ("NAV").

GPS receivers measure and analyze signals from the satellites, and estimate the corresponding coordinates of the receiver position, as well as the instantaneous receiver clock bias. GPS receivers may also measure the velocity of the receiver. The quality of these estimates depends upon the number and the geometry of satellites in view, measurement error and residual biases. Residual biases generally include satellite ephemeris bias, satellite and receiver clock errors, and ionospheric and tropospheric delays. If receiver clocks were perfectly synchronized with the satellite clocks, only three range measurements would be needed to allow a user to compute a three-dimensional position. This process is known as multilateration. However, given the engineering difficulties and the expense of providing a receiver clock whose time is exactly synchronized, conventional systems generally account for the amount by which the receiver clock time differs from the satellite clock time when computing a receiver's position. This clock bias is determined by computing a measurement from a fourth satellite using a processor in the receiver that correlates the ranges measured from each satellite. This process requires four or more satellites from which four or more measurements can be obtained to estimate four unknowns x, y, z, b. The unknowns are latitude, longitude, altitude and receiver clock offset. The amount b, by which the processor has added or subtracted time, is the instantaneous bias between the receiver clock and the satellite clock. It is possible to calculate a location with only three satellites when additional information is available. For example, if the altitude of the handset or mobile device is well known, then an arbitrary satellite measurement may be included that is centered at the center of the earth and possesses a range defined as the distance from the center of the earth to the known altitude of the handset or mobile device. The altitude of the handset may be known from another sensor or from information from the cell location in the case where the handset is in a cellular network.

Traditionally, satellite coordinates and velocity have been computed inside the GPS receiver. The receiver obtains satellite ephemeris and clock correction data by demodulating the satellite broadcast message stream. The satellite transmission contains more than 400 bits of data transmitted at 50 bits per second. The constants contained in the ephemeris data coincide with Kepler orbit constants requiring many mathematical operations to turn the data into position and velocity data for each satellite. In one implementation, this conversion requires 90 multiplies, 58 adds and 21 transcendental function cells (sin, cos, tan) in order to translate the ephemeris into a satellite position and velocity vector at a single point, for one satellite. Most of the computations require double precision, floating point processing.

Thus, the computational load for performing the traditional calculation is significant. The mobile device must include a high-level processor capable of the necessary calculations, and such processors are relatively expensive and consume large amounts of power. Portable devices for consumer use, e.g., a cellular phone or comparable device, are preferably inexpensive and operate at very low power. These design goals are inconsistent with the high computational load required for GPS processing. Further, the slow data rate from the GPS satellites is a limitation. GPS acquisition at a GPS receiver may take many seconds or several minutes, during which time the receiver circuit and processor of the mobile device must be continuously energized. Preferably, to maintain battery life in portable receivers and transceivers such as mobile cellular handsets, circuits are de-energized as much as possible. The long GPS acquisition time can rapidly deplete the battery of a mobile device. In any situation and particularly in emergency situations, the long GPS acquisition time is inconvenient.

Assisted-GPS ("A-GPS") has gained significant popularity recently in light of stringent time to first fix ("TTFF"), i.e., first position determination and sensitivity, requirements of the FCC E-911 regulations. In A-GPS, a communications network and associated infrastructure may be utilized to assist the mobile GPS receiver, either as a standalone device or integrated with a mobile station or device. The general concept of A-GPS is to establish a GPS reference network (and/or a wide-area D-GPS network or a wide area reference network ("WARN")) including receivers with clear views of the sky that may operate continuously. This reference network may also be connected with the cellular infrastructure, may continuously monitor the real-time constellation status, and may provide data for each satellite at a particular epoch time. For example, the reference network may provide ephemeris information, UTC model information, ionosphere model information, and other broadcast information to the cellular infrastructure. As one skilled in the art would recognize, the GPS reference receiver and its server (or position determining entity) may be located at any surveyed location with an open view of the sky. Typical A-GPS information may include data for determining a GPS receiver's approximate position, time synchronization mark, satellite ephemerides, various model information and satellite dopplers. Different A-GPS services may omit some of these parameters; however, another component of the supplied information is the identification of the satellites for which a device or GPS receiver should search. From such assistance data, a mobile device will attempt to search for and acquire satellite signals for the satellites included in the assistance data. If, however, satellites are included in the assistance data that are not measurable by the mobile device (e.g., the satellite is no longer visible, etc.), then the mobile device will waste time and considerable power attempting to acquire measurements for the satellite.

A-GPS handset implementations generally rely upon provided assistance data to indicate which satellites are visible or "in view." As a function of the assistance data, a mobile device will attempt to search for and acquire satellite signals for the satellites included in the assistance data. A-GPS positioning may also rely upon the availability of a coarse location estimate to seed the positioning method. This coarse location estimate or reference location may be utilized to determine a likely set of satellites from which a respective mobile device may receive signals. For example, upon receipt of a location request, satellites in view of the reference location for a wireless device may be determined so that a location determining entity, e.g., location information server ("LIS") or mobile location center ("MLC") can provide assistance data for those respective satellites. Once the satellites in view are determined, assistance data for those satellites may be collated (or calculated), encoded into the relevant protocol, and provided to the handset.

There is, however, a need for a method and system for optimizing the process of calculating the satellites in view of the device to achieve a more efficient performance that would overcome the deficiencies of the prior art. Additionally, the performance of the acquisition assistance determination may be increased by optimizing the calculation of satellite velocities. Therefore, an embodiment of the present subject matter provides a method for determining one or more satellites in view of a wireless device. The method may comprise receiving a request for satellite assistance data from a requesting entity and determining a reference location as a function of the request. A set of satellites may be determined as a function of the reference location. Subsequent cached information may be determined for each satellite in the set of satellites if initial cached information for each satellite has been cached for greater than a predetermined time period. One or more satellites in view of the wireless device may then be determined as a function of either the subsequent cached information or initial cached information.

Another embodiment of the present subject matter may provide a method for determining an estimated location of a wireless device. The method may include receiving a request for satellite assistance data from a wireless device and determining a reference location of the wireless device. A set of satellites may be determined as a function of the reference location, and subsequent cached information determined for each satellite in the set of satellites if initial cached information for each satellite in the set of satellites has been cached for greater than a predetermined time period. One or more satellites in view of the wireless device may be determined as a function of either the subsequent cached information or initial cached information. Assistance data may then be transmitted to the wireless device, the assistance data including information from the one or more satellites in view, and an estimated location of the wireless device determined from the included information.

A further embodiment of the present subject matter provides a method for determining one or more satellites in view of a wireless device. The method may include receiving a request for satellite assistance data from a requesting entity, and determining a reference location as a function of the request. A first set of satellites in view may be determined as a function of the reference location if there is information available from a first cached set of satellites, the first cached set of satellites being cached for less than a predetermined time period. A second set of satellites in view may be determined as a function of the reference location if the first cached set of satellites has been cached for greater than the predetermined time period and determining additional cached information for each satellite in the second set of satellites as a function of the reference location. In another embodiment, information of the second set of satellites in view may be cached for the reference location.

An additional embodiment of the present subject matter provides a method for determining an estimated location of a wireless device. The method may comprise receiving a request for satellite assistance data from a wireless device and determining a reference location of the wireless device. A first set of satellites in view may be determined as a function of the reference location if there is information available from a first cached set of satellites, the first cached set of satellites being cached for less than a predetermined time period. A second set of satellites in view may be determined as a function of the reference location if the first cached set of satellites has been cached for greater than the predetermined time period and determining additional cached information for each satellite in the second set of satellites as a function of the reference location. Assistance data may then be transmitted to the wireless device, the assistance data including information from the first or second sets of satellites in view, and an estimated location determined for the wireless device from the included information.

One embodiment of the present subject matter may provide a system for determining one or more satellites in view of a wireless device. The system may comprise circuitry for receiving a request for satellite assistance data from a requesting entity and circuitry for determining a reference location as a function of the request. The system may further include circuitry for determining a set of satellites as a function of the reference location and circuitry for caching initial information for each satellite in the set of satellites. The system may also comprise circuitry for determining and caching subsequent cached information for each satellite in the set of satellites if the cached initial information has been cached for greater than a predetermined time period, as well as circuitry for determining one or more satellites in view of the wireless device as a function of either the subsequent cached information or initial cached information.

These embodiments and many other objects and advantages thereof will be readily apparent to one skilled in the art to which the invention pertains from a perusal of the claims, the appended drawings, and the following detailed description of the embodiments.

DETAILED DESCRIPTION

Figure 1:
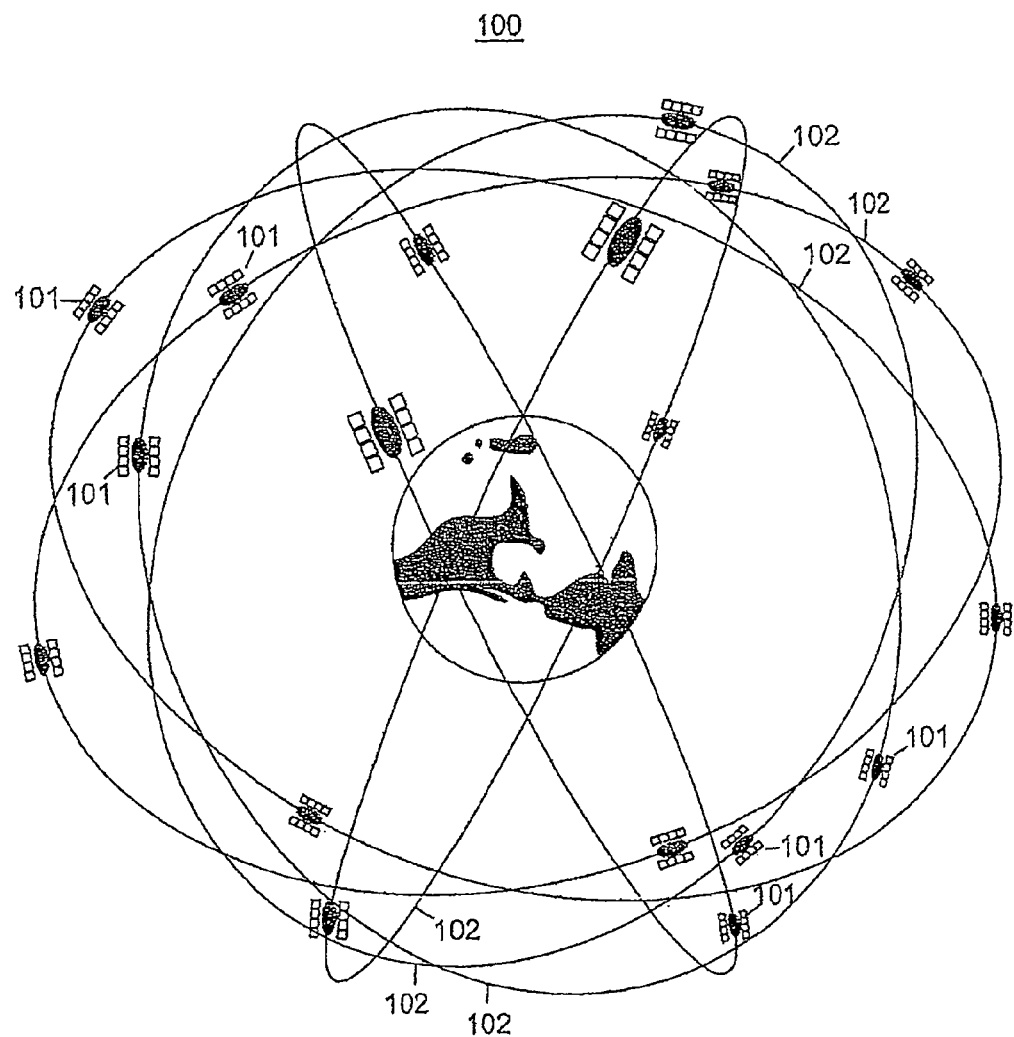
FIG. 1 is a schematic representation of a constellation of GPS satellites.

With reference to the figures where like elements have been given like numerical designations to facilitate an understanding of the present subject matter, the various embodiments of a method and system for selecting optimal satellites in view for the location of a wireless device are herein described.

The disclosure relates to a mobile appliance or device and a location determining system using satellite signals and/or measurements of these satellite signals. Exemplary devices may include, but are not limited to, a cellular device, text messaging device, computer, portable computer, vehicle locating device, vehicle security device, communication device, and wireless transceiver. The satellites may be considered as part of a Global Navigation Satellite System ("GNSS"), such as, but not limited to, the U.S. Global Positioning System ("GPS"). While the following description references the GPS system, this in no way should be interpreted as limiting the scope of the claims appended herewith. As is known to those of skill in the art, other GNSS systems operate, for the purposes of this disclosure, similarly to GPS, such as, but not limited to, the European Satellite project, Galileo; the Russian satellite navigation system, GLONASS; the Japanese Quasi-Zenith Satellite System ("QZSS"), and the Chinese satellite navigation and positioning system called Beidou (or Compass). Therefore, references in the disclosure to GPS and/or GNSS, where applicable, as known to those of skill in the art, apply to the above-listed GNSS systems as well as other GNSS systems not listed above.

Generally wireless A-GPS devices or handsets have a low time to first fix ("TTFF") as the devices are supplied with assistance data from an exemplary communications network to assist in locking onto or acquiring satellites quickly. Exemplary A-GPS devices may include, but are not limited to, a cellular device, text messaging device, computer, portable computer, vehicle locating device, vehicle security device, communication device, and wireless transceiver. These devices may provide satellite measurements back to a location determining system to perform a position calculation. Exemplary network elements that supply the assistance data and/or perform the position calculation may be a location determining system such as a Mobile Location Center ("MLC"), location information server or system ("LIS"), or other comparable network element. The location determining system may generally be a node in a wireless network that performs the location of a mobile device.

Typical A-GPS information includes data for determining a GPS receiver's approximate position, time synchronization mark, satellite ephemerides, and satellite dopplers. Different A-GPS services may omit some of these parameters; however, another component of the supplied information may be the identification of the satellites for which a device or GPS receiver should search. Acquisition assistance data for A-GPS is generally comprised of several fields (GPS time of week, satellite ID, Doppler, Code Phase, satellite elevation, azimuth, etc.) having a consistent content (but not encoding format) across the various Positioning Calculation Application Part ("PCAP"), Radio Resource LCS Protocol ("RRLP") and Position Determination for Dual Mode ("PDDM") specifications. Generally, a message sequence starts with a request for GPS assistance data arriving in an MLC with an estimated handset location. This may include the horizontal uncertainty, the altitude and the altitude uncertainty. In some instances, the estimated handset location may be the location of a serving cell tower. The MLC may then calculate the assistance data and return it to the handset. Thus, once the satellites in view are determined, assistance data for the satellites may be collated, encoded into the relevant protocol, and provided to the respective wireless device. The handset may then use the assistance data to lock onto the respective satellite(s) and report the measurements to the server. Of course, embodiments of the present subject matter may determine the reference location of the wireless device in any number of ways and such a disclosure should not limit the scope of the claims appended herewith. For example, the reference location may be determined by any of the methods described in co-pending U.S. application Ser. No. 12/389,734 filed Feb. 20, 2009, entitled "System and Method for Determining a Reference Location of a Mobile Device," the entirety of which is incorporated herein by reference. Further, the reference location may be determined as a function of signals received from a terrestrial radio frequency ("RF") technology such as, but not limited to, a cellular technology or a different type of network such as WiFi or WiMax.

Using the determined reference location, the MLC may then determine a set of satellites in view at a particular time. This may be accomplished by determining the location and/or velocity of each of the satellites in view at that particular time, determining the elevation for each satellite from the reference location, selecting a set of satellites in view as those satellites having an elevation greater than a predetermined mask angle, and/or piecing together acquisition assistance data if necessary. An exemplary method of determining the location for each satellite is described in the GPS Interface Control Document ("ICD"), the entirety of which is incorporated herein by reference. Generally, this procedure utilizes a satellite's ephemeris parameters and places these parameters into a series of equations. A portion of this procedure to determine a satellite's location solves Kepler's non-linear equation. The general method of solving Kepler's equation utilizes an iterative solution; however, the comparatively large number of steps results in a relatively expensive and time-consuming operation.

The coordinate reference frame employed by GPS is the World Geodetic System 84 ("WGS 84") reference frame. Certain embodiments of the present subject matter may determine the location of satellites in WGS 84 Earth-Centered Earth-Fixed ("ECEF") coordinates. The reference location may be in the same coordinate reference frame, and the elevation for each satellite may be determined therefrom. An exemplary mask angle may be configured as an elevation in degrees greater than which it is likely the respective mobile device can acquire and lock onto a respective satellite(s). For example, the mask angle may be set to zero but may also be set to a number above the horizon such as five, ten, fifteen or more degrees.

When assistance data is required for the determination of the location of a wireless device, a server should determine which satellites are in view to provide appropriate assistance data as described above. For a high throughput system such as an MLC (e.g., 200 TPS) these calculations may be performed regularly. As discussed above, one of the data types for handset-assisted GPS is acquisition assistance. To determine the predicted Doppler of a satellite from a certain reference location, the velocity of the satellite may be determined as a three dimensional vector. Doppler may be estimated from the difference of a user motion and the motion of the satellite. To generate acquisition assistance it may be assumed that a handset is stationary on the surface of the rotating earth where the Doppler, in hertz, is calculated as the dot product of the difference in velocities and the estimated line of sight vector:

$$D = -\left(\frac{v_s - v_r}{c} \cdot \hat{l}_s\right) f \quad (1)$$

where $v_s$ represents the velocity of the satellite, $v_r$ represents the velocity of the receiver, c is the speed of light, $\hat{l}_s$ represents the estimated line of sight unit vector, and f represents the transmitted frequency of L1 which is 1575.42 MHz. The c and f scalars may simply convert the result to Hz. The line of sight vector may be calculated as the difference between the satellite and the receiver location divided by the norm of the difference:

$$\hat{l}_s = \frac{r_s - \hat{r}_r}{|r_s - \hat{r}_r|} \quad (2)$$

where $r_s$ represents the location of the satellite in Earth Centered Earth Fixed ("ECEF") coordinates and $r_r$ represents the location of the receiver. The frequency may be corrected to account for clock error as described in Xu, Guichang, 2003, GPS Theory, Algorithms and Applications, Springer at p. 75, the entirety of which is incorporated herein by reference.

The velocity of the receiver is zero since the equation is in ECEF coordinates. The velocity of the satellite $v_s$ may be determined in the perifocal coordinate system (inertial) and then converted back to the ECEF coordinate system (rotating). The polar equation of a conic may be utilized to determine the semi-latus rectum or ρ:

$$\rho = r(1 + e \cos v) \quad (3)$$

where r represents the norm of the difference between the location of the satellite and the receiver, e represents the eccentricity provided straight from the ephemeris, and v represents the true anomaly at epoch which is also from the ephemeris.

As discussed in Bate, et al., 1971, Fundamentals of Astrodynamics, New York, Dover Publications, Inc., the entirety of which is incorporated herein by reference, the following formulas may be derived providing velocity with respect to the P and Q unit vectors of the perifocal coordinate system:

$$v_p = \sqrt{\frac{\mu}{\rho}} (-\sin v) \quad (4)$$

$$v_q = \sqrt{\frac{\mu}{\rho}} (e + \sin v) \quad (5)$$

where μ represents WGS 84 universal gravitation parameter from the WGS 84 specification. The velocity may then be converted from the perifocal coordinate system to the geocentric-equatorial frame ($v_i$, $v_j$, $v_k$) using the rotation matrix R as shown:

$$\begin{bmatrix} v_i \\ v_j \\ v_k \end{bmatrix} = \tilde{R} \begin{bmatrix} v_p \\ v_q \\ v_w \end{bmatrix} \quad (6)$$

$v_w$ is zero as a result of being in the perifocal coordinate system and the W axis being in the orbit plane (thus, the velocity of the satellite is zero in this direction). The rotation matrix may be represented as:

$$\tilde{R} = \begin{bmatrix} R_{11} & R_{12} & R_{13} \\ R_{21} & R_{22} & R_{23} \\ R_{31} & R_{32} & R_{33} \end{bmatrix} \quad (7)$$

where the elements of the rotation matrix are as follows:

$$R_{11} = \cos \Omega \cos \omega - \sin \Omega \sin \omega \cos i \quad (8)$$

$$R_{12} = -\cos\Omega\cos\omega - \sin\Omega\cos\omega\cos i \quad (9)$$

$$R_{13} = \sin\Omega\sin i \quad (10)$$

$$R_{21} = \sin\Omega\cos\omega + \cos\Omega\sin\omega\cos i \quad (11)$$

$$R_{22} = -\sin\Omega\sin\omega + \cos\Omega\cos\omega\cos i \quad (12)$$

$$R_{23} = -\cos\Omega\sin i \quad (13)$$

$$R_{31} = \sin\omega\sin i \quad (14)$$

$$R_{32} = \cos\omega\sin i \quad (15)$$

$$R_{33} = \cos i \quad (16)$$

where $\omega$ represents the argument of perigee from the ephemeris, $\Omega$ represents the longitude of the ascending node which is calculated from the ephemeris, and i represents the corrected inclination which is also calculated from the ephemeris.

Expanding the matrix expression provides:

$$\begin{bmatrix} v_i \\ v_j \\ v_k \end{bmatrix} = \begin{bmatrix} R_{11} & R_{12} & R_{13} \\ R_{21} & R_{22} & R_{23} \\ R_{31} & R_{32} & R_{33} \end{bmatrix} \begin{bmatrix} v_p \\ v_q \\ v_w \end{bmatrix} \quad (17)$$

Multiplying matrices provides the following expressions in the geocentric equatorial frame for $v_i$, $v_j$, and $v_k$:

$$v_i = R_{11}v_p + R_{12}v_q + 0 \quad (18)$$

$$v_j = R_{21}v_p + R_{22}v_q + 0 \quad (19)$$

$$v_k = R_{31}v_p + R_{32}v_q + 0 \quad (20)$$

Of course, the R terms may be expanded appropriately. Converting the expanded velocities to the ECEF reference frame ($v_x$, $v_y$, $v_z$) from the inertial reference frame provides the following matrix notation:

$$\begin{bmatrix} v_x \\ v_y \\ v_z \end{bmatrix} = \begin{bmatrix} v_i \\ v_j \\ v_k \end{bmatrix} - \begin{bmatrix} -\dot{\Omega}y \\ \dot{\Omega}x \\ 0 \end{bmatrix} \quad (21)$$

where the matrix on the right hand side of Equation (21) represents the result of the cross product of the omega matrix (the Earth's rotation rate) and the r matrix (the coordinates of the user). The $\dot{\Omega}$ term represents the WGS 84 constant for the Earth's rotation rate in radians per second.

This velocity and/or location may be optimized by various embodiments of the present subject matter. For example, exemplary satellites generally orbit at high speeds; however, the angular speed relative to a mobile device on the surface of the Earth is slow. Thus, for a one minute time difference, the elevation of an exemplary satellite may only change by one or two degrees. In addition, the satellite velocity does not change significantly. Embodiments of the present subject matter may optimize the determination of visible satellites by storing or caching the location of the satellites (e.g., in ECEF coordinates) and/or velocities of the satellites and recalculating their respective locations and/or velocities as a function of a predetermined time period. An exemplary time period may be, but is not limited to, five minutes. Such embodiments would save a considerable amount of processing and expense. Therefore, when the satellites in view of a mobile device are required, the process described above may be utilized but the location and/or velocity of any one or plural satellites may be used from the cache. Thus, the assistance data being provided and employed in such a system would be current, but the respective satellite locations and velocities would not be recalculated each time.

Another embodiment of the present subject matter may cache information from satellites in view as a function of information provided by a terrestrial source. For example, when a location query or request is received from a mobile device, an embodiment may cache the satellites associated with the cell identification in the request. The cached list of satellites in view from that particular cell may then be utilized for subsequent queries for that cell until a predetermined time period passes. If a query comes in for that cell after its respective cache has expired (e.g., five minutes), then the satellites in view may be determined either directly from the ephemeris information or optimally using the cached locations of the satellites.

Figure 2:
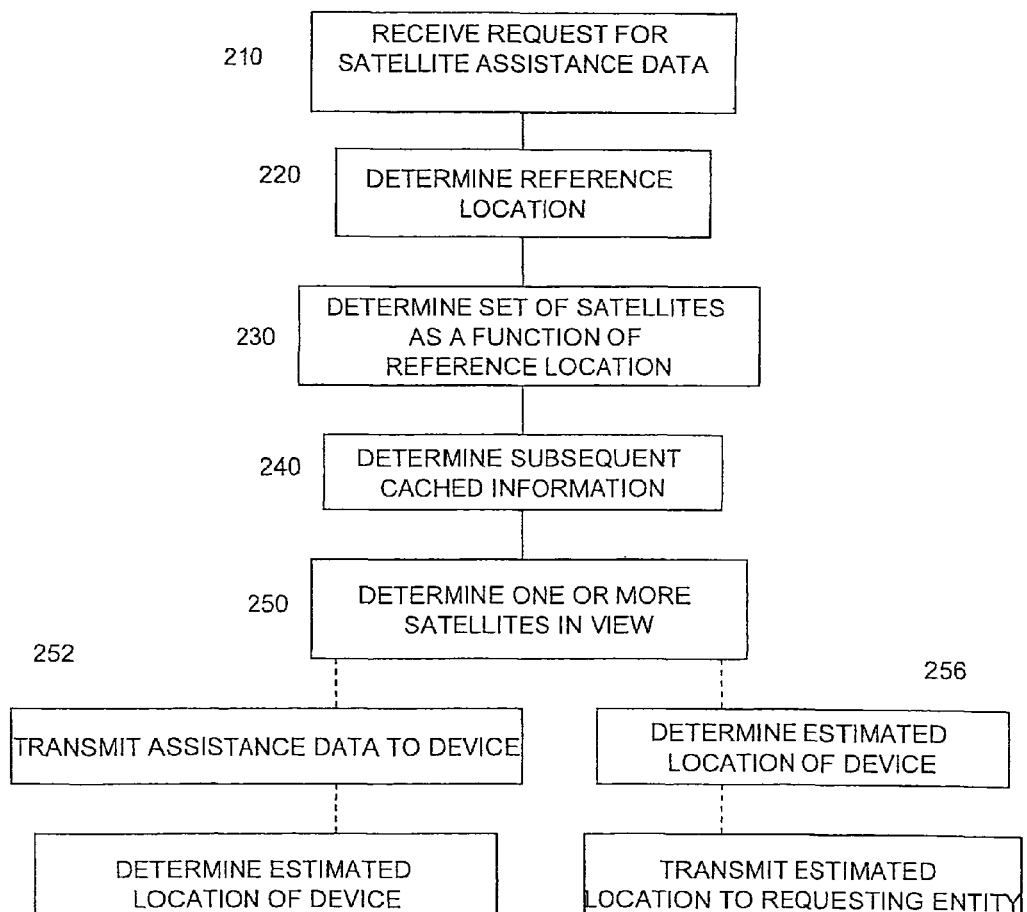
FIG. 2 is an algorithm according to one embodiment of the present subject matter.

FIG. 2 is an algorithm 200 according to one embodiment of the present subject matter. With reference to FIG. 2, at step 210, a request for satellite assistance data may be received from a requesting entity, and at step 220 a reference location determined as a function of the request. The requesting entity may be a wireless device or a location based service. Exemplary satellites may be part of a GNSS such as, but not limited to, GPS, Galileo system, GLONASS system, QZSS, Beidou satellite system, Compass satellite system, and combinations thereof. An exemplary device may be a cellular device, text messaging device, computer, portable computer, vehicle locating device, vehicle security device, communication device, and wireless transceiver. At step 230, a set of satellites may be determined as a function of the reference location. In one embodiment, step 230 may include determining at least one of a location and velocity for each satellite in the set of satellites, and determining an elevation for each satellite in the set of satellites as a function of the reference location, wherein each satellite in the set has an elevation greater than a predetermined threshold. An exemplary threshold may be, but is not limited to, a value between zero and five degrees above the horizon of the Earth.

Subsequent cached information for each satellite in the set of satellites may then be determined if initial cached information for each satellite in the set of satellites has not been cached or has been cached for greater than a predetermined time period at step 240. The initial cached information and subsequent cached information may be, but is not limited to, satellite position information, ephemeris information, satellite velocity information, time information, clock correction information, satellite locations, and combinations thereof. The predetermined time period is configurable and may be approximately five minutes, less than five minutes, or greater than five minutes. Information may also be cached for additional sets of satellites at intervals defined by the predetermined time period. The algorithm 200 may also include caching the determined subsequent cached information in place of the initial cached information. One or more satellites in view of the wireless device may then be determined at step 250 as a function of either the subsequent cached information or initial cached information.

In another embodiment, assistance data may be transmitted to a wireless device, the assistance data including information from the one or more satellites in view at step 252, and an estimated location of the wireless device determined from the information at step 254. In a further embodiment, an estimated location of a wireless device may be determined as a function of information from the determined one or more satellites in view at step 256, and then the estimated location transmitted to the requesting entity at step 258.

Figure 3:
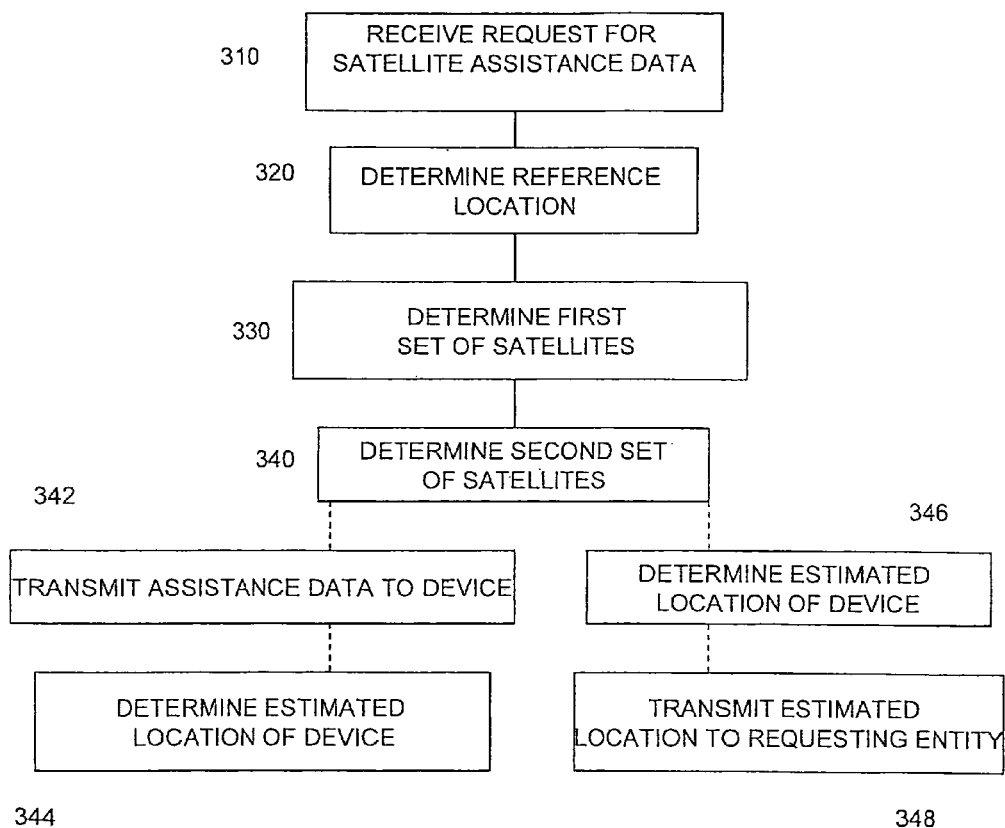
FIG. 3 is an algorithm according to another embodiment of the present subject matter.

FIG. 3 is another algorithm 300 according to an embodiment of the present subject matter. With reference to FIG. 3, at step 310, a request for satellite assistance data from a requesting entity may be received, and a reference location determined as a function of the request at step 320. An exemplary requesting entity may be, but is not limited to, a wireless device or a location based service. At step 330, a first set of satellites in view may be determined as a function of the reference location if there is information available from a first cached set of satellites, the first cached set of satellites being cached for less than a predetermined time period. At step 340, a second set of satellites in view may be determined as a function of the reference location if the first cached set of satellites has been cached for greater than the predetermined time period and determining additional cached information for each satellite in the second set of satellites as a function of the reference location. One or more satellites the first and second sets of satellites may be different, each of the satellites may be the same between the sets, or the sets may be mutually exclusive. Exemplary information for cached satellites may be, but are not limited to, satellite position information, ephemeris information, satellite velocity information, time information, clock correction information, satellite locations, and combinations thereof. Of course, the predetermined time period is configurable as discussed above. In a further embodiment, the algorithm 300 may include caching information of the second set of satellites in view for the reference location.

In another embodiment, assistance data may be transmitted to a wireless device, the assistance data including information from the first or second sets of satellites in view at step 342, and an estimated location of the wireless device determined from the information at step 344. In a further embodiment, an estimated location of a wireless device may be determined as a function of information from the first or second sets of satellites in view at step 346, and then the estimated location transmitted to the requesting entity at step 348. The algorithm 300 may also cache information for additional sets of satellites at intervals defined by the predetermined time period.

Figure 4:
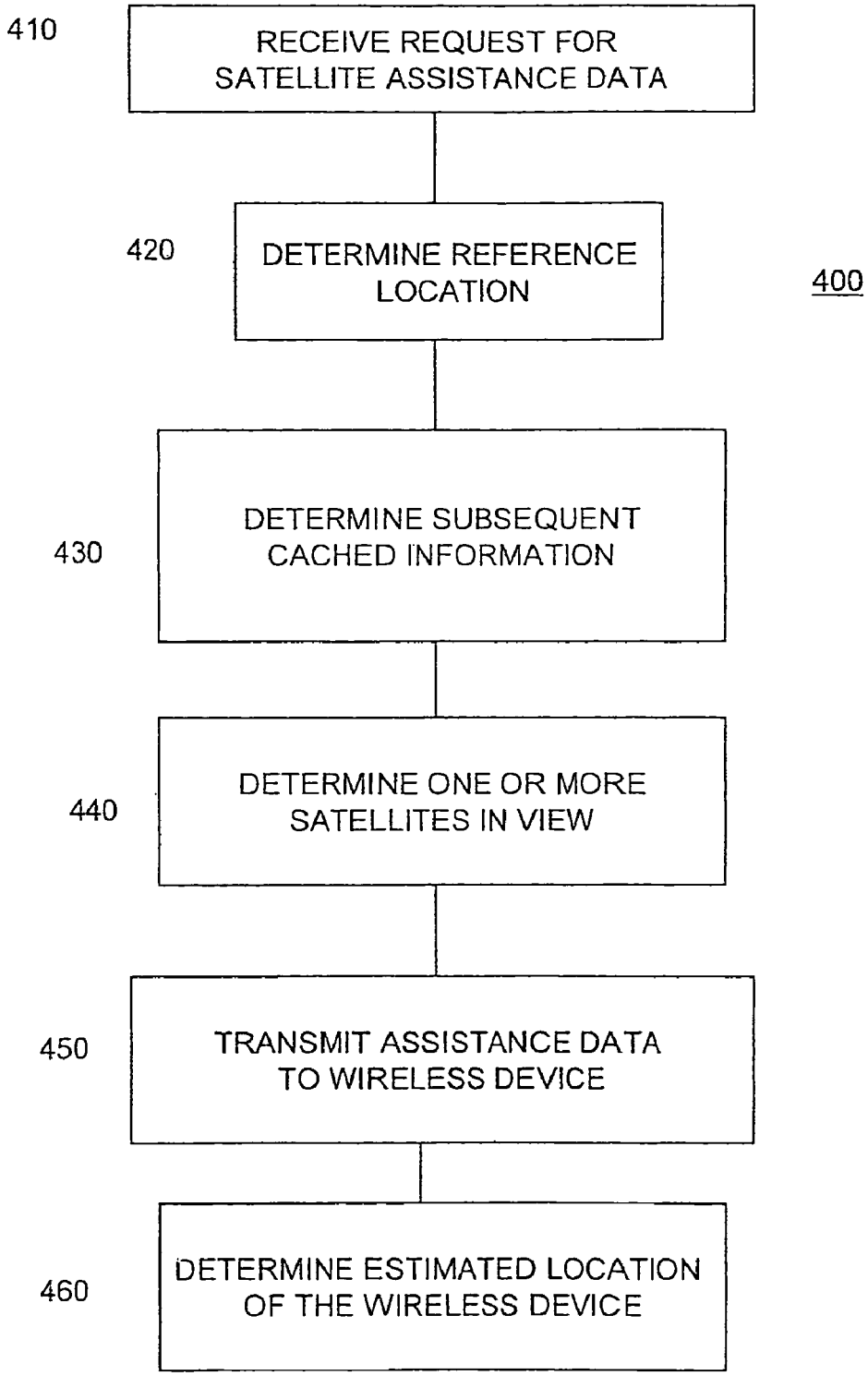
FIG. 4 is an algorithm according to a further embodiment of the present subject matter.

FIG. 4 is another algorithm 400 according to a further embodiment of the present subject matter. With reference to FIG. 4, at step 410, a request for satellite assistance data may be received from a wireless device, and at step 420 a reference location determined for the wireless device. At step 430, a set of satellites may be determined as a function of the reference location. Subsequent cached information for each satellite in the set of satellites may then be determined if initial cached information for each satellite in the set of satellites has been cached for greater than a predetermined time period at step 440. One or more satellites in view of the wireless device may then be determined at step 450 as a function of either the subsequent cached information or initial cached information. Assistance data may be transmitted to a wireless device, the assistance data including information from the one or more satellites in view at step 460, and an estimated location of the wireless device determined from the information, at step 470.

Figure 5:
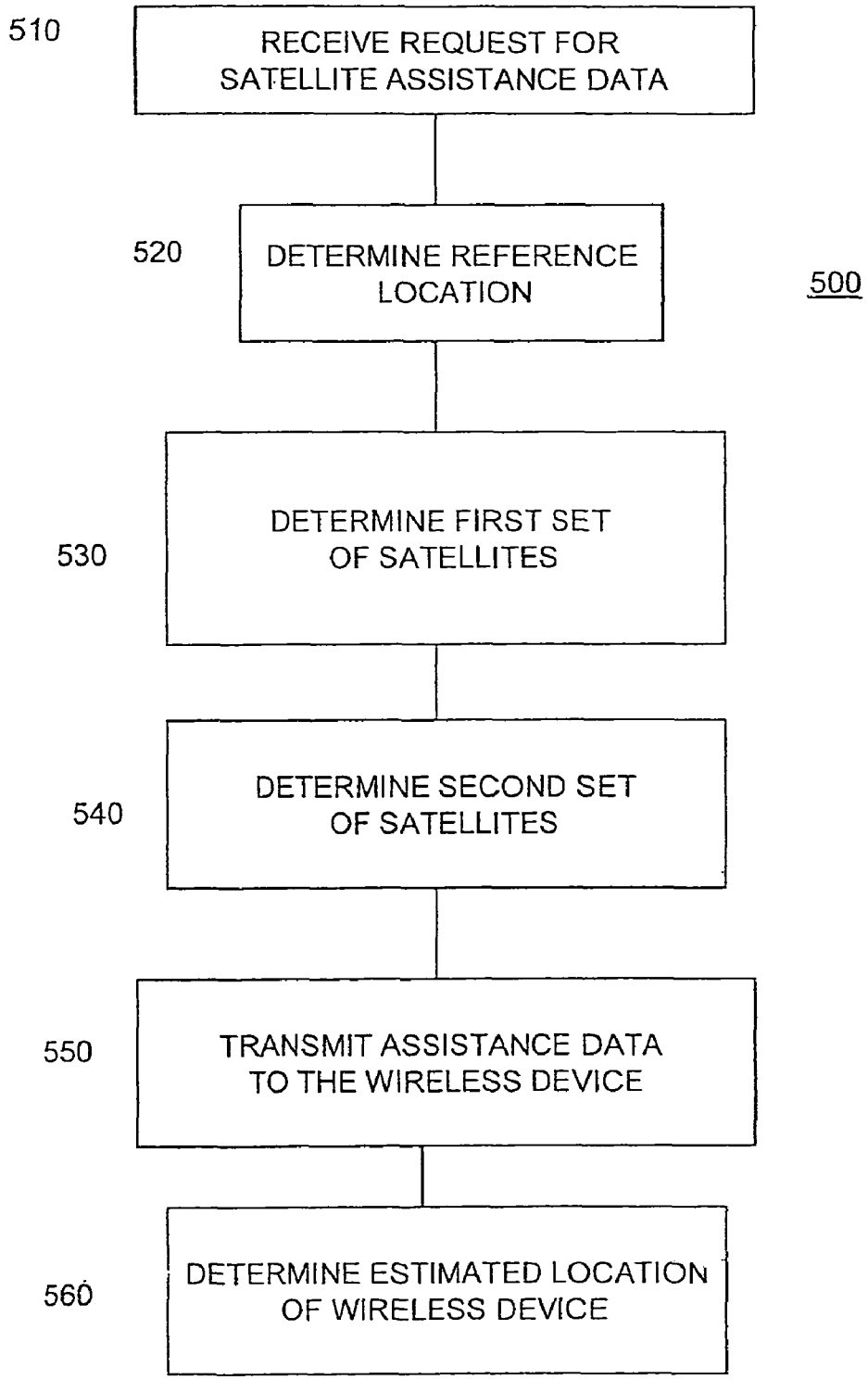
FIG. 5 is an algorithm according to an embodiment of the present subject matter.

FIG. 5 is another algorithm 500 according to a further embodiment of the present subject matter. With reference to FIG. 5, at step 510, a request for satellite assistance data from a wireless device may be received, and a reference location for the wireless device determined at step 520. At step 530, a first set of satellites in view may be determined as a function of the reference location if there is information available from a first cached set of satellites, the first cached set of satellites being cached for less than a predetermined time period. At step 540, a second set of satellites in view may be determined as a function of the reference location if the first cached set of satellites has been cached for greater than the predetermined time period and determining additional cached information for each satellite in the second set of satellites as a function of the reference location. Assistance data may be transmitted to the wireless device, the assistance data including information from the first or second sets of satellites in view at step 550, and an estimated location of the wireless device determined from the information at step 560.

Figure 6:
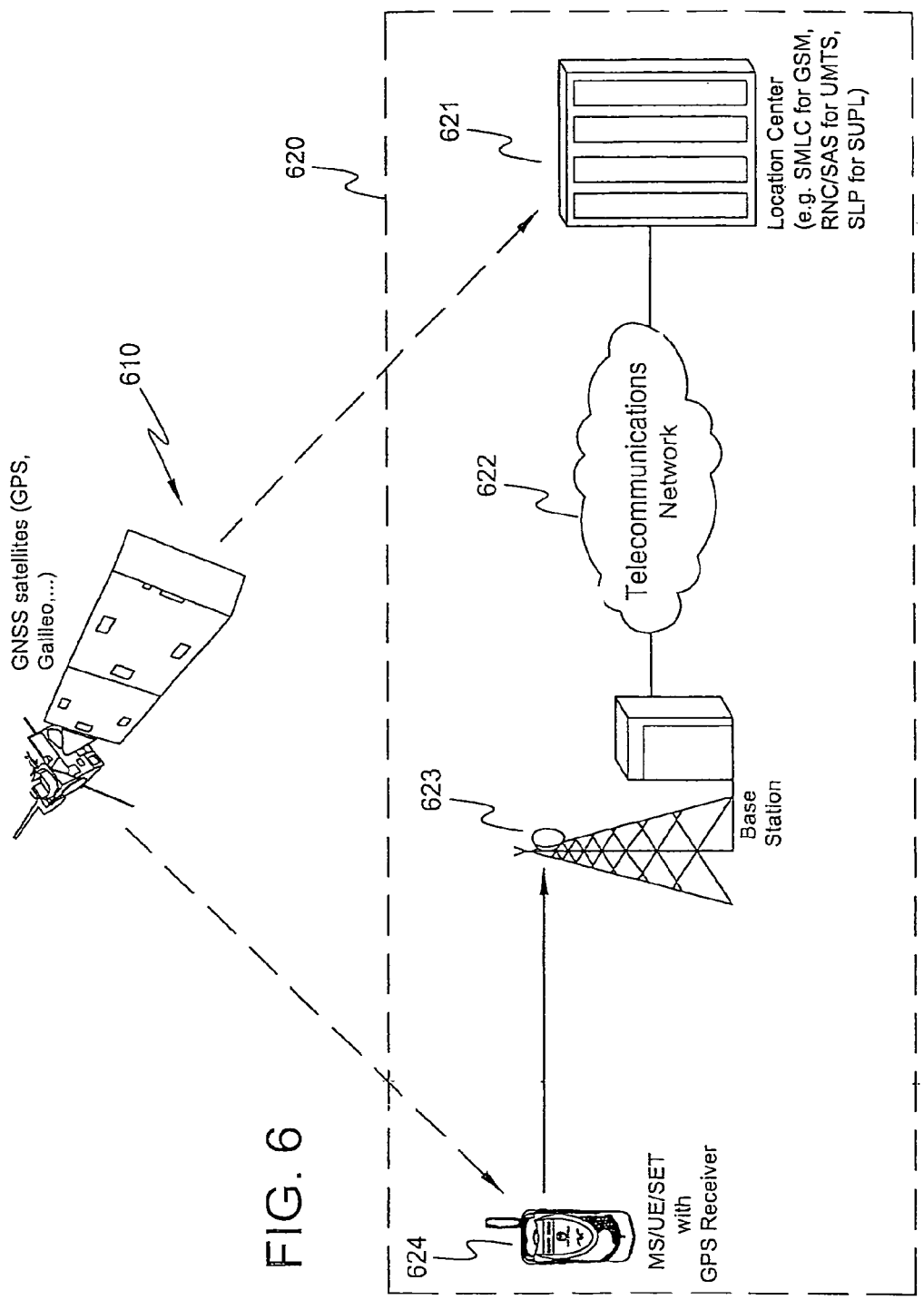
FIG. 6 is a schematic representation for implementing one embodiment of the present subject matter.

FIG. 6 is a schematic representation for implementing one embodiment of the present subject matter. With reference to FIG. 6, a satellite system 610 communicates with a ground system 620. The ground system 620 may include a cellular network having a location center 621. The location center 621 may be an MLC, LIS or a central office configured to communicate with a telecommunication network 622 and at least one base station 623. In one embodiment of the present subject matter, a device 624 communicates with the base station 623 to acquire GPS assistance data. The location center 621 may or may not receive a preliminary estimate of the receiver's location or boundary thereof on the basis of the receiver's cell site or other area, such as the boundary of the communications network or an area or region such as, but not limited to, city, municipality, county, state, country, or continent. The location center 621 may also determine a plurality of satellites as a function of this boundary or region. This information may then be transmitted or relayed to the mobile receiver and utilized for location determination. The location center 621 may also receive satellite information from GPS satellites. The satellite information may include the satellite's broadcast ephemeris information of the broadcasting satellite or that of all satellites or that of selected satellites. The location center 621 may relay the information back to the device 624 or use the information, either singularly or along with some preliminary estimation of the device's location, to assist the device in a geographic location determination. In another embodiment, any one or plural steps illustrated in FIGS. 2, 3, 4 and 5 may be implemented at the location center 621 and communicated to the device 624. Of course, the estimated location of the device 624 may also be determined as a function of additional signals provided by the network 622. The location center 621 or another remote device or server (not shown) may include circuitry for optimizing the information for any number of satellites by caching locations of each satellite and determining further cached locations of each satellite. The system may include a transmitter for transmitting assistance data to the device 624, the assistance data including location and/or velocity information from an optimized set of satellites or for transmitting an estimated location of the device 624 to a requesting entity.

As shown by the various configurations and embodiments illustrated in FIGS. 1-6, a method and system for selecting optimal satellites for A-GPS location of a device are herein described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What is claim is:

1. A method for determining one or more satellites in view of a wireless device comprising:
   (a) receiving a request for satellite assistance data from a requesting entity;

(b) determining a reference location as a function of the request;
(c) determining a set of satellites as a function of the reference location;
(d) determining subsequent cached information for one or more satellites in the set of satellites when previously cached information for the one or more satellites in the set of satellites has been cached for greater than a predetermined time period, the time period determined as a function of elevation of a respective satellite; and
(e) determining one or more satellites in view of the wireless device as a function of either the subsequent cached information or previously cached information.

2. The method of claim 1 wherein the previously cached information and subsequent cached information is selected from the group consisting of:
satellite position information, ephemeris information, satellite velocity information, time information, clock correction information, satellite locations, and combinations thereof.

3. The method of claim 1 further comprising the steps of:
(f) transmitting assistance data to a wireless device, the assistance data including information from the one or more satellites in view; and
(g) determining an estimated location of the wireless device from the information.

4. The method of claim 1 further comprising the steps of:
(f) determining an estimated location of a wireless device as a function of information from the determined one or more satellites in view; and
(g) transmitting the estimated location to the requesting entity.

5. The method of claim 1 wherein the requesting entity is a wireless device or a location based service.

6. The method of claim 1 further comprising the step of caching the determined subsequent cached information in place of the previously cached information.

7. The method of claim 1 wherein the predetermined time period is approximately five minutes.

8. The method of claim 1 wherein the predetermined time period is greater than five minutes.

9. The method of claim 1 further comprising the step of caching information for additional sets of satellites at intervals defined by the predetermined time period.

10. The method of claim 1 wherein the satellites are part of a Global Navigation Satellite System ("GNSS") selected from the group consisting of: a Global Positioning System ("GPS"), Galileo system, GLONASS system, Quasi-Zenith Satellite System ("QZSS"), Beidou satellite system, Compass satellite system, and combinations thereof.

11. The method of claim 1 wherein the device is selected from the group consisting of: cellular device, text messaging device, computer, portable computer, vehicle locating device, vehicle security device, communication device, and wireless transceiver.

12. A system for determining a set of satellites in view of a wireless device comprising:
(a) circuitry for receiving a request for satellite assistance data from a requesting entity;
(b) circuitry for determining a reference location as a function of the request;
(c) circuitry for determining a set of satellites as a function of the reference location;
(d) circuitry for caching initial information for each satellite in the set of satellites;
(e) circuitry for determining and caching subsequent cached information for each satellite in the set of satellites when the cached initial information has been cached for greater than a predetermined time period, the time period determined as a function of elevation of a respective satellite; and
(f) circuitry for determining one or more satellites in view of the wireless device as a function of either the subsequent cached information or initial cached information.

13. The system of claim 12 further comprising:
(g) a transmitter for transmitting assistance data to the requesting entity, the assistance data including information for the one or more satellites in view or for transmitting an estimated location of a wireless device to the requesting entity.

14. The system of claim 13 wherein the requesting entity is a wireless device or a location based service.

15. The system of claim 12 wherein the predetermined time period is approximately five minutes.

16. The system of claim 12 wherein the satellites are part of a Global Navigation Satellite System ("GNSS") selected from the group consisting of: a Global Positioning System ("GPS"), Galileo system, GLONASS system, Quasi-Zenith Satellite System ("QZSS"), Beidou satellite system, Compass satellite system, and combinations thereof.

17. The system of claim 12 wherein the device is selected from the group consisting of: cellular device, text messaging device, computer, portable computer, vehicle locating device, vehicle security device, communication device, and wireless transceiver.

18. A method for determining one or more satellites in view of a wireless device comprising:
(a) receiving a request for satellite assistance data from a requesting entity;
(b) determining a reference location as a function of the request;
(c) determining a first set of satellites in view as a function of the reference location when there is information available from a first cached set of satellites, the first cached set of satellites being cached for less than a predetermined time period, the time period determined as a function of elevation of a respective satellite; and
(d) determining a second set of satellites in view as a function of the reference location when the first cached set of satellites has been cached for greater than the predetermined time period and determining additional cached information for each satellite in the second set of satellites as a function of the reference location.

19. The method of claim 18 further comprising the step of:
(e) caching information of the second set of satellites in view for the reference location.

20. The method of claim 18 wherein one or more satellites the first and second sets of satellites are different.

21. The method of claim 18 wherein information for cached satellites are selected from the group consisting of: satellite position information, ephemeris information, satellite velocity information, time information, clock correction information, satellite locations, and combinations thereof.

22. The method of claim 18 further comprising the steps of:
(e) transmitting assistance data to a wireless device, the assistance data including information from the first or second sets of satellites in view; and
(f) determining an estimated location of the wireless device from the information.

23. The method of claim 18 further comprising the steps of:
(e) determining an estimated location of a wireless device as a function of information from the first or second sets of satellites in view; and (f) transmitting the estimated location to the requesting entity.

24. The method of claim 18 wherein the requesting entity is a wireless device or a location based service.

25. The method of claim 18 wherein the predetermined time period is approximately five minutes.

26. The method of claim 18 further comprising the step of caching information for additional sets of satellites at intervals defined by the predetermined time period.

27. The method of claim 18 wherein the satellites are part of a Global Navigation Satellite System ("GNSS") selected from the group consisting of: a Global Positioning System ("GPS"), Galileo system, GLONASS system, Quasi-Zenith Satellite System ("QZSS"), Beidou satellite system, Compass satellite system, and combinations thereof.

28. The method of claim 18 wherein the device is selected from the group consisting of: cellular device, text messaging device, computer, portable computer, vehicle locating device, vehicle security device, communication device, and wireless transceiver.

29. A method for determining an estimated location of a wireless device comprising:

(a) receiving a request for satellite assistance data from a wireless device;
(b) determining a reference location of the wireless device;
(c) determining a set of satellites as a function of the reference location;
(d) determining subsequent cached information for one or more satellites in the set of satellites when previously cached information for the one or more satellites in the set of satellites has been cached for greater than a predetermined time period, the time period determined as a function of elevation of a respective satellite;
(e) determining one or more satellites in view of the wireless device as a function of either the subsequent cached information or previously cached information;
(f) transmitting assistance data to the wireless device, the assistance data including information from the one or more satellites in view; and
(g) determining an estimated location of the wireless device from the included information.

* * * * *